US008594978B2

(12) United States Patent
Kadaba

(10) Patent No.: US 8,594,978 B2
(45) Date of Patent: *Nov. 26, 2013

(54) SYSTEM AND METHOD FOR GENERATING A TRANSPORTING INSTRUCTION USING AN ENVIRONMENTAL SENSOR

(71) Applicant: United Parcel Service of America, Inc., Atlanta, GA (US)

(72) Inventor: Nagesh Kadaba, Roswell, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,630

(22) Filed: Mar. 1, 2013

(65) Prior Publication Data

US 2013/0179111 A1 Jul. 11, 2013

Related U.S. Application Data

(63) Continuation of application No. 13/535,867, filed on Jun. 28, 2012, now Pat. No. 8,412,489, which is a continuation of application No. 13/073,555, filed on Mar. 28, 2011, now Pat. No. 8,280,686, which is a continuation of application No. 12/251,771, filed on Oct. 15, 2008, now Pat. No. 7,930,142, which is a continuation of application No. 11/552,413, filed on Oct. 24, 2006, now Pat. No. 7,454,315, which is a continuation of application No. 10/770,119, filed on Feb. 2, 2004, now Pat. No. 7,149,658.

(51) Int. Cl.
*G06F 11/30* (2006.01)
*G08B 1/08* (2006.01)

(52) U.S. Cl.
USPC ...................................... 702/184; 340/539.26

(58) Field of Classification Search
USPC ......... 702/184, 34–36, 81, 84, 127, 130–136, 702/138–140, 182–183, 187–188; 705/6, 705/22–23, 28; 340/539.1, 539.22, 539.26, 340/540, 572.1; 235/384; 700/9, 11, 28, 32, 700/108–110, 113, 115, 213–215, 299

See application file for complete search history.

(56) References Cited

U.S. PATENT DOCUMENTS 3,438,489 A 4/1969 Cambornac et al.
4,234,926 A 11/1980 Wallace et al.
(Continued)

FOREIGN PATENT DOCUMENTS

CA 2345763 4/2000
EP 0 996 105 4/2000
(Continued)

OTHER PUBLICATIONS

Alien Technology, "2450 MHz Long Range Backscatter RFID System," website article, 6 pages, Jan. 29, 2004.
Auto ID Center, "Auto-ID on the Move: The Value of Auto-ID Technology in Freight Transportation," Accenture White Pages, pages Cover, 1-26, Nov. 1, 2002, Distribution Restricted to Sponsors Until Feb. 1, 2003, Cambridge, Massachusetts.

(Continued)

*Primary Examiner* — Toan Le
(74) *Attorney, Agent, or Firm* — Alston & Bird LLP

(57) ABSTRACT

A system including an environmental sensor that can travel with a product within a carrier's logistics network. The environmental sensor being configured to sense an environmental condition capable of affecting the product to generate product environment data. The system includes a scanner configured to read product environment data from the environmental sensor. The system also includes a hub control unit configured to communicate with the scanner and receive the product environment data from the scanner and determines whether the product environment data transcends a limit of exposure of the product to an environmental condition. The hub control unit is also configured to generate a transporting instruction to redirect transport of the product to an alternate destination different from its original destination if the hub control unit determines that the product environment data indicates the environmental condition of the product has transcended the limit of exposure.

18 Claims, 6 Drawing Sheets

(56) References Cited

U.S. PATENT DOCUMENTS

| | | |
|---|---|---|
| 5,347,274 A | 9/1994 | Hassett |
| 5,433,311 A | 7/1995 | Bonnet |
| 5,489,017 A | 2/1996 | Bonnet |
| 5,497,140 A | 3/1996 | Tuttle |
| 5,547,063 A | 8/1996 | Bonnet |
| 5,684,705 A | 11/1997 | Herbert |
| 5,719,771 A | 2/1998 | Buck et al. |
| 5,774,876 A | 6/1998 | Woolley et al. |
| 5,892,441 A | 4/1999 | Woolley et al. |
| 5,936,523 A | 8/1999 | West |
| 5,971,587 A | 10/1999 | Kato et al. |
| 6,005,211 A | 12/1999 | Huang et al. |
| 6,249,227 B1 | 6/2001 | Brady et al. |
| 6,285,916 B1 | 9/2001 | Kadaba et al. |
| 6,294,997 B1 | 9/2001 | Paratore et al. |
| 6,483,434 B1 | 11/2002 | UmiKer |
| 6,496,806 B1 | 12/2002 | Horwitz et al. |
| 6,539,360 B1 | 3/2003 | Kadaba |
| 6,557,758 B1 | 5/2003 | Monico |
| 6,712,276 B1 | 3/2004 | Abali et al. |
| 6,720,888 B2 | 4/2004 | Eagleson et al. |
| 6,721,617 B2 | 4/2004 | Kato et al. |
| 6,919,803 B2 | 7/2005 | Breed |
| 6,944,574 B2 | 9/2005 | LeBlanc et al. |
| 7,009,517 B2 | 3/2006 | Wood |
| 7,035,856 B1 | 4/2006 | Morimoto |
| 7,149,658 B2 | 12/2006 | Kadaba |
| 7,454,315 B2 * | 11/2008 | Kadaba ................. 702/184 |
| 7,930,142 B2 * | 4/2011 | Kadaba ................. 702/184 |
| 8,280,686 B2 * | 10/2012 | Kadaba ................. 702/184 |
| 8,412,489 B2 * | 4/2013 | Kadaba ................. 702/184 |
| 2002/0098272 A1 | 7/2002 | Silver |
| 2003/0014143 A1 | 1/2003 | Kato et al. |
| 2003/0101069 A1 | 5/2003 | Sando |
| 2003/0146836 A1 | 8/2003 | Wood |
| 2003/0163287 A1 | 8/2003 | Vock et al. |
| 2004/0008123 A1 | 1/2004 | Carrender et al. |
| 2004/0024644 A1 | 2/2004 | Gui et al. |
| 2004/0049315 A1 | 3/2004 | Sansone et al. |
| 2004/0100379 A1 | 5/2004 | Boman et al. |
| 2004/0124977 A1 | 7/2004 | Biffar |
| 2004/0143354 A1 | 7/2004 | Kato et al. |
| 2004/0149826 A1 | 8/2004 | Alleshouse |
| 2004/0193449 A1 | 9/2004 | Wildman et al. |
| 2004/0243353 A1 | 12/2004 | Aghassipour |
| 2004/0257203 A1 | 12/2004 | Maltsev et al. |
| 2005/0073406 A1 | 4/2005 | Easley et al. |
| 2005/0080566 A1 | 4/2005 | Vock et al. |
| 2005/0099292 A1 | 5/2005 | Sajkowsky |
| 2005/0116034 A1 | 6/2005 | Satake et al. |
| 2006/0109106 A1 | 5/2006 | Braun |
| 2011/0169636 A1 | 7/2011 | Kadaba |

FOREIGN PATENT DOCUMENTS

| | | |
|---|---|---|
| WO | WO-02/26566 | 4/2002 |
| WO | WO 2005/022303 | 3/2005 |

OTHER PUBLICATIONS

Fedex Custom Critical, "FedEx Custom Critical Launches TEMP-ASSURE Validated$^{SM}$," Press Release, 1 page, Feb. 4, 2004, Akron, Ohio.

Syscan International Inc., "New RFID Based Solution for Perishable Products," Accelerating Business Efficiency, 1 page, May 20, 2003, Montreal, Quebec.

Sharp, "In Supply Chain Applications Such As Food Safety Monitoring, ADC Devices Go Beyond Mere Identification to Report on the World Around Them," A Sense of the Real World, pp. 1-8, Aug. 2000.

Sensitech, "Cold Chain Market Shipment Logistics System," Website Article from www.sensitech.com, pp. 13-15, 2001, Beverly, Massachusetts.

International Search Report for International Application No. PCT/US 2004/032470 filed Sep. 30, 2004.

Matrics Group, "RFID Products," Website Article from http:// HYPERLINK "http://www.matricsgroup.com/rfid.asp" www.matricsgroup.com/rfid.asp, Dec. 13, 2001.

RFID Journal, "New Low-cost Temperature Sensor," Website Article from ww.rfidjournal.com/article/articleview/28/1/1/, Jul. 19, 2002.

Sharp, Kevin R., "A Sense of the Real World," Website Article from www.scs-mag.com/reader/2000_09/sens0900/, Sep. 2000.

Shreiner, "E-temp-label," Website Article from www.schreiner-online.com/en/html/gb/medipharm/e-temp-label.htm#, Nov. 29, 2003.

"DHL and Partners Develop RFID Sensor Solution for Pharma Industry," *Freight e-Business News & Resources*, Dec. 21, 2006, http://www.eyefortransport.com/print.asp?news=54063.

"Deutsche Post World Net Starts "DHL Innovation Initiative" with IBM, Intel, Philips, and SAP," *DHL Press Release*, Feb. 16, 2008, DHL International GmbH.

"DHL Time/Temperature Recording Belgium," *RFID for Courier and Postal Services*, May 2004, IDTechEx Ltd.

"DHL and Partners Develop RFID Sensor Solution for Pharmaceutical Industry," *DHL Press Release*, Dec. 20, 2006, DHL International GmbH.

Davie, "Intelligent Tagging for Transport and Logistics: The ParcelCall Approach," *Electronics and Communication Engineering Journal*, Jun. 2002, pp. 122-128.

Search Report dated Mar. 22, 2011, European Application No. 10179509.4.

International Searching Authority, Written Opinion for International Application No. PCT/US2004/032470, mailed Jan. 19, 2005, 5 pages, European Patent Office, The Netherlands.

International Preliminary Examining Authority, International Preliminary Report on Patentability for International Application No. PCT/US2004/032470, dated Jan. 10, 2006, 11 pages, European Patent Office, The Netherlands.

\* cited by examiner

SYSTEM AND METHOD FOR GENERATING A TRANSPORTING INSTRUCTION USING AN ENVIRONMENTAL SENSOR

CROSS-REFERENCE TO RELATED APPLICATIONS

The present application is a continuation of U.S. application Ser. No. 13/535,867, filed Jun. 28, 2012, now U.S. Pat. No. 8,412,489, which is a continuation of U.S. application Ser. No. 13/073,555, filed Mar. 28, 2011, now U.S. Pat. No. 8,280,686, which is a continuation of U.S. application Ser. No. 12/251,771, filed Oct. 15, 2008, now U.S. Pat. No. 7,930,142, which is a continuation of U.S. application Ser. No. 11/552,413, filed Oct. 24, 2006, now U.S. Pat. No. 7,454,315, which is a continuation of U.S. application Ser. No. 10/770,119, filed Feb. 2, 2004, now U.S. Pat. No. 7,149,658, which are all hereby incorporated herein in their entirety by reference.

FIELD OF THE INVENTION

The present invention generally relates to shipping of a product by a carrier under controlled or monitored environmental conditions, such as can be provided by a refrigerated vehicle or shipping container. More particularly, the subject invention relates to systems and methods for processing a product during shipment in response to environmental conditions to which the product is subjected during transportation and storage while in transit from a sender to a receiver of the product.

BACKGROUND OF THE INVENTION

Shipping carriers, such as UPS®, Inc., transport a wide variety of products on behalf of their customers. In most cases, a carrier's customers are either a sender (or "consignor") or a receiver (or "consignee"). As the terms are used herein, a "sender" refers to the person or entity sending the product to a receiver via the carrier, and the "receiver" is the person or entity receiving the product from the sender via the carrier.

Typically, a sender places a product to be shipped in a container or package for shipment, attaches an address label indicating the identity of the receiver and the receiver's address, and leaves the container with the product in a designated place for pickup by the carrier for delivery to the receiver. A driver of a carrier vehicle typically obtains the container with enclosed product at the pickup location, and uses a handheld wireless device to enter relevant data from the shipping label into a tracking system so that the fact that the container and product has been picked up by the carrier can be recorded. The driver then loads the container with its product in the vehicle, and transports same to a hub for sorting and distribution to the next location along the route designated for the package by the carrier's internal routing and control systems. From this hub, the container can be directly delivered to the receiver's location if the delivery is to a receiver in the same vicinity as the sender. Alternatively, the container with the product can be transported via aircraft, train, or a wheeled vehicle to another hub nearer to the receiver's location. It is possible that the container with product can be transported through one or more intermediate hubs before reaching the hub serving the receiver location. A delivery vehicle then transports the container and product therein along the final leg of its route to the receiver's location to complete delivery of the product in its container. The receiver can then open the container and retrieve the product for its own use, or can deliver or sell the product to another person in the distribution chain to the end user of the product.

For the purpose of routing, tracking, and billing for shipment of a product, a carrier can maintain computerized shipping records identifying the sender, the sender's shipping account to be charged for the product shipment, the sender's address, the receiver, the receiver's address for delivery, the level of service selected for shipping the product (i.e., overnight delivery, next-day delivery, two-day delivery, etc.), the weight and dimensions of the container and enclosed product which can be used for logistics planning and billing for the product shipment, special handling instructions for the product, and possibly other information. Some carriers provide the capability to track a shipped product in transit from the sender to the receiver. This provides the benefit of permitting the sender and receiver to determine the status of the shipped product while it is within the carrier's transportation and storage network.

In addition to providing peace of mind to the sender and/or receiver as to the location and status of the product within the carrier's transportation and storage network at any given time, such tracking information can permit the receiver to project when the product will arrive at the receiver's location. The receiver can thus plan activities that are contingent upon receipt of the product, such as the availability of machinery and labor for handling the product, etc. In addition, tracking information permits the sender or receiver to verify that certain actions, such as shipping or delivery of the product, have in fact been taken. This can be useful for verifying compliance (or determining noncompliance) with a contract between the sender and receiver. Such tracking information can also be useful to interested third parties such as insurers, guarantors, or banks, who can have an interest in a product shipment.

To access tracking information, some carriers permit use of a tracking identifier, generally included as a string of alphanumeric characters or bar code, on the shipping label. A customer or other interested party can access such tracking information by contacting a customer service representative of the carrier by telephone and providing the tracking identifier to such representative. The representative can then use the tracking identifier to reference the computerized shipping records via a network internal to the carrier to provide the requested product status information to the customer. Alternatively, some carriers permit customers to directly access shipment tracking information by using a web-based device to access the carrier's computer system via the Internet.

Despite the wide variety of goods shipped by a carrier, most items are transported in a routine manner according to standard shipping procedures developed by the carrier. In other words, despite the various sizes and types of containers and products that can be shipped by a carrier, the containers and their products are handled in the same general way using the same integrated system of hubs with sorters, conveyors, loading and unloading locations, storage areas, and transportation vehicles. However, in some cases, the nature of some products can require a carrier to apply special handling or exception processing during the transporting of such products from a sender to a receiver. The term "special handling" encompasses a variety of operations in which particular products (or a shipment of products) are identified and separated from routine product shipments to be handled differently from routine product shipments in the shipping carrier's transportation and storage system. Such special handling can include, for example, transporting sensitive, explosive, hazardous, or toxic products in a special way. Such handling can be mandated by applicable law or regulation for shipment of the product, can be necessary in order to comply with a customer's request for handling the product, or can be necessary due to the carrier's internal policies or experiences with products of a particular nature. For example, the carrier can be asked by a customer or third party to verify that a refrigerated container holding biological material is functioning at various points along the container's shipping route.

Maintaining the integrity of a product in its protective container throughout transport can be critical to use of the contained product by the receiver or end user. For example, wine typically needs to be maintained within a certain temperature range in order to preserve a desired taste. Therefore, a carrier can be requested to handle a package containing wine with extra care or to inspect the package at one or more points along its route to assure continued viability of the product. For example, the carrier can transport a wine shipment in a temperature-controlled container. By checking a temperature gauge associated with the container at various points along the transportation route designated for the wine product in the carrier's logistics network, proper handling of the product can be inferred from gauge readings confirming the product to be at a permissible temperature.

However, such technique does not inform or alert the carrier and customer as to whether proper environmental conditions were or were not maintained during the times the product was in the carrier's logistics network between checkpoints. Therefore, unbeknownst to either the carrier or customer, it is possible that the receiver can be provided with a product shipment that was subjected to an environmental condition that makes it unfit for use by the receiver or end user. Thus, exposure to an environmental condition can damage or destroy the product shipment, or possibly even render it dangerous to the receiver or end user. Furthermore, continuing to ship a product that has been rendered unfit for the receiver's or end user's purposes by exposure to an environmental condition can result in a substantial waste of transportation, labor, financial, and other resources of the carrier and/or the customer.

Therefore, a need exists in the art for a method and system for processing packages that require transport according to one or more prescribed environmental conditions. The method and system should provide a way of verifying whether or not certain environmental conditions are maintained throughout the shipping process for a product. Additional benefits could be obtained if the system and method could react to exposure of a product to an environmental condition rendering it unfit, to avoid unnecessary use of the carrier's or other's resources.

BRIEF SUMMARY OF THE INVENTION

The present invention, in its various embodiments, overcomes the above-noted disadvantages of previous devices and techniques.

A system in accordance with one embodiment of the invention comprises a system including an environmental sensor that can travel with a product within a carrier's logistics network. The environmental sensor is configured to sense an environmental condition capable of affecting the product to generate product environment data. The system includes a scanner configured to read product environment data from the environmental sensor. The system also includes a hub control unit configured to communicate with the scanner. The hub control unit is also configured to receive the product environment data from the scanner and determines whether the product environment data transcends a limit of exposure of the product to an environmental condition. The hub control unit is further configured to generate a transporting instruction to redirect transport of the product to an alternate destination different from its original destination if the hub control unit determines that the product environment data indicates the environmental condition of the product has transcended the limit of exposure.

In another embodiment of the present invention comprises a method including scanning, with a scanner, an environmental sensor physically associated with a product in a container to read product environment data from the environmental sensor. The product in the container may be under transport within a carrier's logistics network. The method may also include transmitting the product environment data from the scanner to a computer. The method may further include determining with the computer whether an environmental condition of the contained product has transcended a limit based on the product environment data scanned from the environmental sensor. The method may also include automatically generating a transporting instruction with the computer to redirect the product to an alternate destination different from its original destination if the determining step establishes that the environmental condition has transcended the limit.

The product environment data can relate to various environmental conditions such as temperature, pressure, vacuum, vibration, shock, humidity, moisture, light, air and a chemical to which the product has been subjected. The hub control unit can be configured to generate the transporting instruction to route the package to an alternate tip position corresponding to the alternate destination. The scanner can comprise a radio-frequency identification (RFID) interrogator for electromagnetically scanning the product environment data from the environmental sensor. The hub control unit can be configured to generate and transmit the transporting instruction to the environmental sensor via the scanner to store the transporting instruction in the environmental sensor for use by the machine controller in transporting the product. The computer can be configured to generate the transporting instruction to route the product in the container to the alternate destination which is a disposal site. The hub control unit can be configured to generate the transporting instruction to route the product in the container to the alternate destination which is that of a second receiver that can make use of the product affected by the environmental condition. The hub control unit can be configured to generate the transporting instruction to route the product in the container to the alternate destination which is that of a holding area for inspection of the product to determine whether the product has been adversely affected by the environmental condition.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1. is a view of a product delivery system that employs environmental sensor technology to capture product environment data in accordance with an embodiment of the present invention.

DETAILED DESCRIPTION OF THE INVENTION

The present invention now will be described more fully hereinafter with reference to the accompanying drawings, in which some, but not all, embodiments of the invention are shown. Indeed, these inventions can be embodied in many different forms and should not be construed as limited to the embodiments set forth herein; rather, these embodiments are provided so that this disclosure will satisfy applicable legal requirements. Like numbers refer to like elements throughout.

The following paragraphs describe novel and nonobvious systems and methods in which environmental sensor technology is used in connection with a product delivery system. The systems and methods described herein provide means for tracking and verifying the environmental conditions to which a product within a container has been subjected during its movement through a supply chain.

As used herein the following terms have the following meanings:

"And/or" means any one, some or all of the things listed before and after such term. Thus, "A, B, and/or C" means "any one, some, or all of A, B, and C."

"Container" will be used herein to refer to virtually any object that can be used to enclose or hold a product, such as an envelope, packet, mailing tube, bag, box, package, can, bucket, crate, palate, shipping container, etc.

Figure 1:
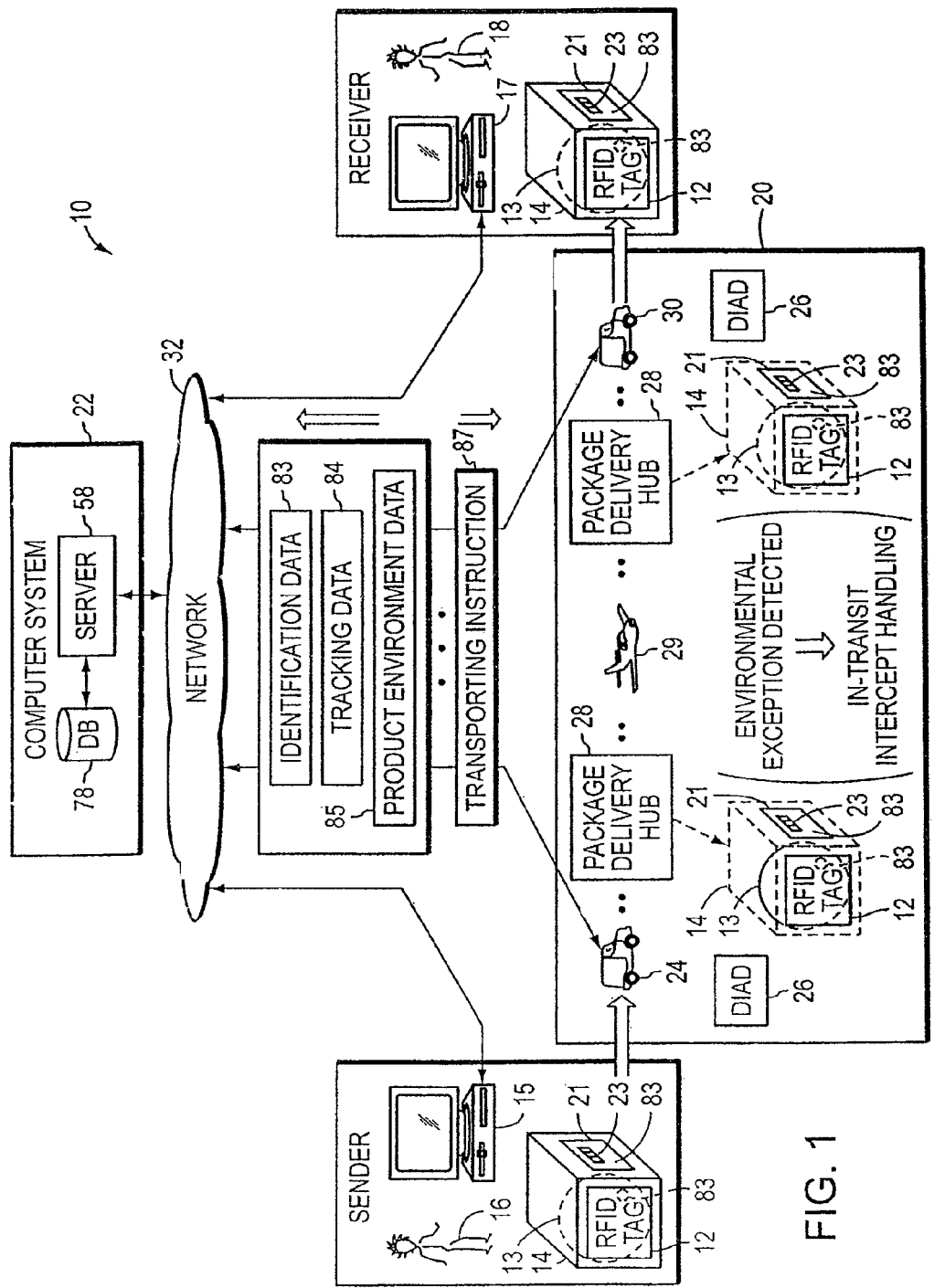

FIG. 1. is a view of a product delivery system 10 that employs environmental sensor technology to capture product environment data in accordance with an embodiment of the present invention. The system 10 includes an environmental sensor 12 physically associated with a product 13 in a container 14 that is to be shipped from a sender 16 to a receiver 18. The system 10 further comprises a carrier logistics network 20 for shipping the container 14 with its product 13, and a computer system 22 for monitoring various aspects of the shipping process.

In one embodiment, the environmental sensor 12 associated with the product 13 in the container 14 is a radio-frequency identification (RFID) sensor tag. As referred to herein, an RFID sensor is an automated data collection device having an integrated environmental sensor. As is known in the art, RFID sensor technology provides a wireless means of automated data collection that eliminates the need for a direct line of sight between a data reader and the RFID tag. This allows the sensor tag 12 to be placed anywhere on or in the product 13 or the container 14. In other words, the sensor 12 can be placed inside the container 14, it can be affixed to an outer surface of the container, or it can be positioned directly on the product 13 that is inside the container, for example. The environmental sensor portion of the device 12 is preferably capable of sensing one or more environmental conditions, such as temperature, pressure, vacuum, vibration, shock, humidity, moisture, light, air, and the presence or absence of a chemical. These types of environmental sensor devices 12 are "off-the-shelf" products known to those of ordinary skill in the art. For example, an RFID environmental sensor capable of detecting changes in one or more such environmental conditions is described in U.S. Pat. No. 6,294,997 issued to Paratore, which is hereby incorporated by reference.

The product 13 and/or container 14 can have identification data 83 for identifying the product and/or container 14. The identification data 83 can be, by way of example and not limitation, a tracking identifier 23 for uniquely identifying the product 13 and/or container 14 during the shipping process. The tracking identifier 23 can thus be an alphanumeric number such as a "1Z" number or a barcode such as a one-dimensional representation of the "1Z" number uniquely assigned to a shipping label, or a Maxicode® two-dimensional pattern, which are used by UPS®, Inc. to track packages. It is also possible that the identification data 83 can be another kind of identifier, such as an electronic product code (EPC), global trade item number (GTIN), vehicle identification number (VIN), etc. The identification data 83 can as well comprises data indicating the serial or unit number of a product, its manufacturer, a stock keeper's number (SKU), characteristics of the product, such as its color, style, size, weight, conditioning, the value added tax (VAT) to which the product is subject, etc.

In one embodiment, the identification data 83 is stored in the sensor 12 and can be read by a scanner at one or more points along the shipping route. In another embodiment, the identification data 83 is identified on a printed medium 21 attached to the package. The printed medium 21 can comprise a conventional shipping label with the identification data 83 encoded in optically-readable form such as an alphanumeric character string, a one- or two-dimensional bar code, or other machine- or human-readable form. The identification data 83 can be used by the computer system 22 to allow product environment data 85, and optionally also tracking data 84, to be associated with the product 13 and/or container 14 as it is shipped via the carrier's logistics network 20.

In other words, as the product 13 in the container 14 is transported from the sender 16 to the receiver 18, scanners internal to the carrier's logistics network 20 can scan the identification data 83 on the container 14 and/or product 13, to generate tracking data 84 indicating the status of the product during transport. For example, the identification data 83 of the product 13 and/or container 14 can be scanned by such equipment at one or more of a number of different points, such as by a driver 24 who picks up the package at the sender location 16 and uses a hand-held scanning device 26 to read the identification data from the container 14, at hubs 28 that receive and sort the package and have equipment to scan the identification data, and finally by the delivery driver 30 who delivers the package to the delivery location 18 and uses a hand-held device 26, to scan the identification data to generate tracking data 84 prior to delivery.

The tracking data 84 can include data identifying the date, time, and place of particular events associated with the container 14 as it is transported from the sender 16 to the receiver 18 within the carrier's logistics network 20. Such events can include the arrival or departure of the container 14 at or from particular locations within the logistics network 20 of the carrier as the package is transported. Such tracking data 84 can also include the identity of persons handling the container 14, such as the pickup or delivery driver, or a person acknowledging receipt of the package at a particular location by signing for the package. The tracking data 84 can be transmitted via a network 32 to the computer system 22 from the various scan locations, for storage therein. The computer system 22 can provide access to the tracking data 84 related to the product 13 via the network 32, so that a sender 16, a receiver 18, pickup and delivery personnel, and potentially others, can determine the status of the product 13 during transportation of the product in the carrier's logistics network.

Similarly, product environment data 85 can also be obtained by scanning the environmental sensor 12 that is physically associated with the product 13, at one or more points along the shipping route. The type of product environment data 85 obtained from the sensor 12 depends on the type of sensor used. Preferably, the environmental sensor 12 is capable of sensing one or more environmental conditions such as temperature, pressure, vacuum, vibration, shock, humidity, moisture, light, air, and the presence or absence of a particular chemical. In one embodiment, the environmental sensor 12 is an RFID sensor, and the product environment data 85 is read wirelessly when the sensor comes within range of a scanner. In one embodiment, the sensor 12 is operable to generate time data in association with product environment data for indicating the time of sensing the environment condition associated with the container 14.

In other words, this type of sensor 12 can be used to record history data of the environmental conditions that a product 13 and/or container 14 is exposed to during transport. This is a great advantage over previous technologies in that it provides the capability to determine what environmental conditions have impacted the product 13 during shipment not only at checkpoints where scanners read data from the sensors 12, but also at other locations in between checkpoints since the sensor in effect maintains a record of the environmental conditions affecting the product along its journey through the carrier's logistics network 20. The capability to verify that one or more environmental conditions have been maintained during transport and storage of a product can be extremely important when shipping a variety of products that require special handling. A few examples of products that may require special handling because of their sensitivity to temperature, pressure, light, air and/or other environmental conditions include pharmaceuticals, biological tissue, drugs, and perishable foods.

This capability has numerous benefits, including providing the ability for the carrier's customer to confirm that the product 13 has not been subjected to an adverse condition during shipment, and thus that the product is suitable for use by the receiver or other user downstream in the supply chain from the receiver. It also enables the carrier to assure the customer that the product 13 has not been subjected to an adverse environmental condition, and thus that the carrier's contract with the customer has been fulfilled. Moreover, the record of environmental conditions to which the product 13 has been subjected can be used to determine the entity at fault in subjecting the product to an environmental condition, rendering it unfit for use during shipment. It can also be used by the carrier for testing or quality control purposes to determine proper functioning and correction of the equipment and processes in its logistics network 20 to ensure that a product 13 is not subjected to an environmental condition that renders it unfit for its intended purpose during shipment. As will be described in detail below, the product environment data read from the sensor 12 can be used for transporting the container 14 based on the product environment data.

The present invention can also operate with other types of environmental sensors 12 known in the art. For example, in addition to detecting and recording product environment data associated with a product 13 and/or a container 14, some environmental sensors 12 can be programmed to determine whether the environmental condition of a product has transcended a minimum or maximum limit or range, based on the product environment data detected by the sensor. In one embodiment, data indicating whether a minimum or maximum limit or range was transcended is read from the sensor 12 at one or more points in the shipping process. In another embodiment, the sensor 12 can comprise a visual indicator that changes its physical properties in response to an environmental condition transcending a minimum or maximum limit or range. For example, the visual indicator can include at least one light-emitting diode (LED). The LED can be used to signify that an environmental condition has transcended a minimum or maximum limit or rage by, for example, transitioning from a non-illuminated state to an illuminated state, or by being illuminated so as to change from a first color (e.g., green) to a second color (e.g., red) in response to the environment condition of the contained product 13 transcending a minimum or maximum limit or range. These types of visual indicators can be used to alert delivery personnel handling such packages 14 of the need to take appropriate action with regard to the product 13 that has been exposed to an unacceptable environmental condition.

The invention is not limited to use of LEDs as visual indicators to indicate exposure of a product 13 to an unacceptable environmental condition: virtually any sensor 12 that changes its visual appearance or other physical property in response to an environmental condition can be used. Such sensor 12 can be one that permits sensing of sensor's state without requiring line of sight, or it can be one that requires line of sight, or even contact, in order to read the sensor's state indicating whether the product 13 has been exposed to an adverse environmental condition. Possibilities of sensors 12 having visual indicators that can be used in the subject invention include temperature-sensitive visual indicators such as paper thermometers or thermo-labels, liquid crystal temperature strips which change color in response to changes in temperature, per hydronium (pH) strips which change color in response to the pH of the product's environment, electrochemical sensor strips that change color in the presence of a chemical or element, sensor strips that measure an environmental condition such as the amount of ultraviolet light or other wavelength range, pressure-sensitive strips, and other devices.

As mentioned above, a relatively complete record of the environmental condition to which a product 13 has been subjected during shipment and storage can be obtained by a sensor 12 that senses the environmental condition periodically or otherwise along its route and stores sensed product environment data 85 for later retrieval by a scanner. How frequently the sensor 12 should sample and store measurements as product environment data 85 depends upon the nature of the product 13 and its sensitivity to exposure to the environmental condition. In general, the sampling period of the sensor 12 should be less than the time required for the product 13 to spoil when exposed to the environmental condition to enable the fact of exposure to be recorded and read by a scanner in the carrier's logistics network 20. Thus, for example, if the product 13 will be spoiled by exposure to an unacceptable environmental condition for a few seconds, then the sensor should be capable of taking product environment data readings at least every second or less. Similarly, if the product 13 will spoil if exposed to an unacceptable environmental condition continuously over several hours, then the sensor 12 can take product environment data readings on an hourly or minutely basis, for example.

Spoilage of a product 13 can also depend not only on the time for which the product is exposed to an unacceptable environmental condition, but also upon the severity of the environmental condition. Hence, the sensor 12 can be such as to take product environment data readings more frequently if an environmental condition is relatively severe, and less frequently if the environmental condition to which the product 13 is exposed is less severe. By storing the product environment data readings in correspondence with the time at which such readings were taken, the scanner can read such data so that a relatively complete record of the product environment data 85 affecting the product 13 over time during shipment can be obtained and stored in the computer system 22.

It should be understood that the sensor 12 can be such as to determine itself whether the environmental condition affecting the product 13 with which it is associated has transcended acceptable limit or range values. Thus, the sensor 12 can provide data indicating an alert to the scanner, which in turn relays this data to the carrier computer system 22. In response to this data, the carrier computer system 22 can generate a transporting instruction 87 to transport the spoiled product 13 in accordance with special handling procedures. As another alternative, the sensor 12 can merely store product environment data 85 which is read by a scanner and provided to the carrier computer system 22, which performs the determination to establish whether the product environment data has transcended prescribed limit values or ranges, and if so, generates the transporting instruction 87 to the machinery and/or labor internal to the carrier's logistics network 20 to affect special handling of the product 13. Thus, the sensor 12 can be merely a sensor device, or alternatively, in addition to storing product environment data, it can perform processing to determine whether the product 13 has been subjected to an unacceptable environmental condition, and if so, can transmit the resulting alert data to the carrier computer system 22 via a scanner over a network 32.

Figure 2:
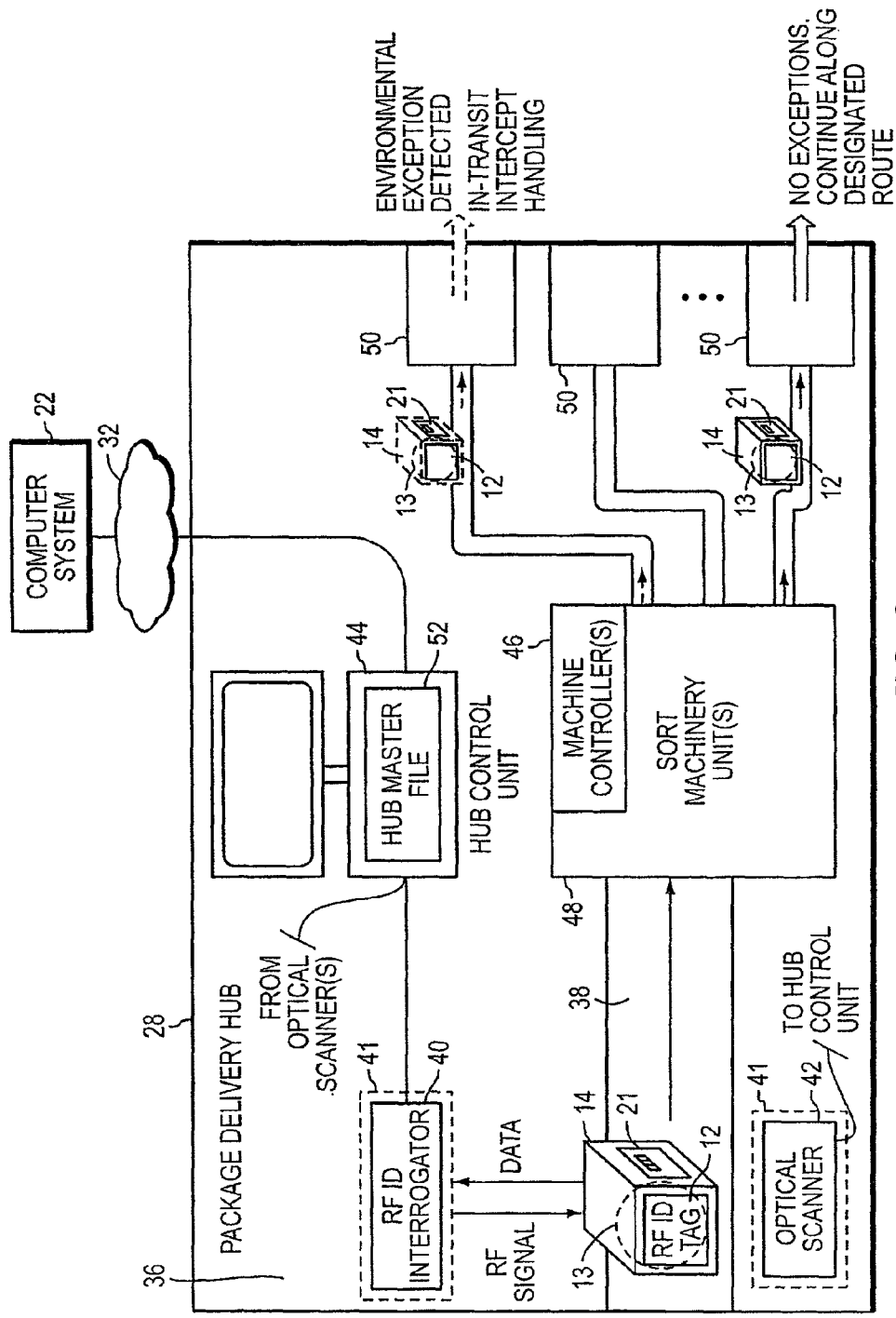
FIG. 2 is a view of a sortation system that is operable to route products based on product environment data associated with the packages in accordance with an embodiment of the present invention.

FIG. 2 shows a sortation system 36 that is operable to route products 13 in containers 14 based on product environment data 85 associated with the packages in accordance with an embodiment of the present invention. In this embodiment, the sortation system 36 includes a conveyor belt 38, scanners 41 including an RFID interrogator 40 and an optical scanner 42, a hub control unit 44, one or more machine controller(s) 46, and one or more sort machinery unit(s) 48. The sortation system 36 described herein can be used in a carrier hub facility and/or as part of a pre-load sortation system. A carrier hub facility is typically an interim facility where contained products or packages are sorted for shipment to other carrier facilities in route to their ultimate destinations. In contrast, products and their containers that pass through a pre-load sortation system are sorted onto vehicles and delivered to their final destination. Although the following paragraphs describe this embodiment of the sortation system 36 in the context of a carrier hub facility 28, one of ordinary skill in the art will readily recognize that this embodiment is equally advantageous in the pre-load sortation context, or in any other package sortation operation.

A container 14 having an environmental sensor 12 arrives at a carrier hub facility 28 and is placed on a conveyor belt 38, which takes the package to the sortation system 36. In one embodiment, the environmental sensor 12 associated with the container 14 is a radio-frequency identification (RFID) sensor. The container 14 also has shipping address data indicating the shipping address of a receiver 18 to which the package is to be sent. In one embodiment, the shipping address data is stored in the sensor 12. In another embodiment, the shipping address data is located on a conventional shipping label 21 associated with the container 14. As the container 14 moves on the conveyor belt 38 to the sortation system 36, an interrogator 40 reads the RFID sensor 12 and captures product environment data 85. In one embodiment, the interrogator 40 also captures shipping address data from the RFID sensor 12.

In another embodiment, the shipping address data is read from a shipping label 21 on the container 14 using an optical scanner 42 in a manner known in the art.

An RFID sensor 12 can be active or passive depending on whether they have an on-board power source or not. In general, an active sensor uses a battery(ies) to power its tag radio transmitter and receiver (or transceiver). This type of sensor usually contains a greater number of components than does a passive sensor. Therefore, an active sensor is usually comparatively large in size and is generally more expensive than a passive sensor. In addition, the life of an active tag is directly related to its battery life. In contrast, a passive tag derives its power from the RFID interrogator 40 used to read it. It responds to the interrogator's signal with a signal modulated by the data stored therein. A passive tag does not use a battery to boost the energy of the reflected signal. But a passive tag can use a battery to maintain memory in the tag or power the electronics that enable the tag to modulate a signal responsive to the interrogator's signal requesting the sensor to provide it with its data. The selection of the sensor 12 for a particular application can depend upon one or more of the above stated considerations regarding RFID sensors and their operation.

When the interrogator 40 reads the RFID sensor 12 associated with the container 14, product environment data 85 is captured and sent by such interrogator to the hub control unit 44. Additionally, whether read from the sensor 12 using an interrogator 40 or read from a shipping label 21 using an optical scanner 42, shipping address data associated with the package is captured and sent to the hub control unit 44. In one embodiment, the hub control unit 44 is a system that controls the movement of packages through the carrier hub facility 28. A carrier hub facility 28 generally contains multiple conveyors that move packages to various tip positions or locations 50 within the building based upon the destination of the products in their containers as indicated by shipping address data. The hub control unit 44 controls transport of the package within the hub to tip positions or locations 50 from which the contained products are loaded onto carrier vehicles for transport to the next location along their routes, or are taken for special handling. The term "tip position" is known in the art and refers to a location in a carrier hub facility 28 in which packages bound for a particular destination are tipped off a conveyor belt and prepared for transit to that destination. Thus, for example, a hub control unit 44 can recognize that packages that are bound for Atlanta, Ga. need to be sorted to tip position #1, whereas packages bound for Los Angeles, Calif. should be sent to tip position #49.

At the start of a package sort, the hub control unit 44 retrieves a hub master file 52 associated with the hub facility 28 and maps the information from the hub master file 52 to the sortation and tip positions 50 for the hub facility. In one embodiment, the data in the hub master file 52 determines the path that will be used to move packages through the hub facility to their next destination. The hub control unit 44 accesses the hub master file 52 and retrieves every possible carrier hub facility that might be the next destination of a package involved in the package sort. The hub control unit 44 then maps each potential package destination to a unique tip position 50 in the hub facility 28. As packages are received, the hub control unit 44 uses the hub master file 52 to determine the next hub facility destination for the package. The hub control unit 44 then determines which location within the building (i.e. which tip position 50) to sort the container 14 to so that the package will be routed to the proper hub facility. And finally, the hub control unit 44 determines the sortation path through the building so that the package will be sorted and transported to the proper tip location.

In one embodiment, the hub control unit 44 is operable to generate a transporting instruction for the container 14 based on product environment data obtained from the sensor 12 using the interrogator 40. In this embodiment, the hub control unit 44 determines whether the environmental condition of the product 13 within the container 14 has transcended a minimum or maximum limit or a range of values based on the product environment data 85, thereby indicating that the product has been exposed to an adverse environmental condition rendering it unfit for its intended purpose. In another embodiment, the hub control unit 44 can also be configured to determine whether the environmental condition of the product 13 came "close" to transcending a first limit or range of values, whereby "close" can be defined as whether or not the environmental condition of the product 13 transcended a second, related limit or range of values, despite having not transcended the first limit or range of values.

In other words, the fact that the environmental condition of the product 13 came "close" to transcending a limit or range of values may not render the product unfit for its intended purpose. However, the discovery of such an occurrence can trigger a requirement that the carrier implement an expedited form of shipping so as to hasten the delivery of the product 13 to the receiver 18. For example, suppose that a shipment of wine or meat is being shipped via some type of ground service, and is expected to arrive at the receiver 18 no less than three days from the time it is discovered that the environmental condition of the product 13 came "close" to transcending a limit or range of values, as determined by checking the product environment data 85 against a second, related limit or range of values. To handle such cases, the hub control unit 44 can be programmed to generate a transporting instruction that upgrades the service level of the product 13 in the container 14 from the current type of ground service to a next-day air service, for example. Therefore, rather than continuing to transport the product 13 to the receiver 18 for at least another three days, by which time the product may become unfit for its intended purpose, the product 13 in the container 14 can be delivered to the receiver within one day of discovering the problem.

Minimum or maximum limits or ranges can be stored on the sensor 12 and read by the interrogator 40, or they can be stored in a data storage device that is accessible by the hub control unit 44 using the identification data that identifies the container 14. If the hub control unit 44 determines that the environmental condition of the container 14 has not transcended a minimum or maximum limit or range based on the product environment data, the hub control unit generates a transporting instruction that causes the container 14 to continue along a shipping route that will take the package to the receiver 18 indicated in the shipping address data. However, if the hub control unit 44 determines that the environmental condition has transcended a minimum or maximum limit or range based on the product environment data, the hub control unit can generate a transporting instruction indicating that the transporting of the container 14 is to be performed differently.

In particular, when it is determined that the environmental condition of the container 14 has transcended a minimum or maximum limit or range of values based on the product environment data, the hub control unit 44 can generate a transporting instruction that causes the container 14 to be redirected to a tip position 50 from which the package will be taken to an alternate destination. The alternate destination can be any destination other than the location of the receiver 18 indicated in the shipping address data associated with the container 14. For example, the package can be routed to an alternate tip position 50 from which the product within the container 14 will to be taken to a disposal site. Or, the container 14 can be routed to a tip position 50 from which the package will be shipped along a modified route that takes it to a second receiver who can make use of the product impacted by the adverse environmental condition. Yet another possibility is that the container 14 will be routed to a tip position 50 from which the package will be placed in a holding area. The container 14 may be placed in a holding area so that it can be inspected, or to await further instructions from the sender 16, the receiver 18 or any other party authorized to redirect the container 14 when it is determined that the environmental condition of the package has transcended a minimum or maximum limit or range based on the product environment data 85 obtained from the sensor 12.

Continuing with FIG. 2, in one embodiment the computer system 22 can be configured to generate a transporting instruction 87 for the container 14 based on the product environment data 85 read from the sensor 12. To accomplish this, the hub control unit 44 transmits the product environment data 85 to the computer system 22 via the network 32. Preferably, the hub control unit 44 also transmits identification data 83 and tracking data 84 associated with the product 13 and/or container 14 to the computer system 22 via the network 32. In one embodiment, the identification data 83 comprises a tracking identifier 23 for uniquely identifying the product 13 and/or container 14 during the shipping process, and the tracking data 84 comprises time and location data identifying when and where, respectively, the scanning of the package took place. The computer system 22 is operable to determine whether the environmental condition of the product 13 within the container 14 has transcended a minimum or maximum limit or range based on the product environment data 85. The minimum or maximum limit or range can be included in the product environment data 85 read from the sensor 12 and transmitted to the computer system 22 via the network 32, or the limits can be stored in a database that is accessible by the computer system 22 using the identification data 83 associated with the product 13 and/or container 14.

In one embodiment, if the computer system 22 determines that the environmental condition has not transcended a minimum or maximum limit or range of permissible values based on the product environment data 85, the container 14 will continue to be routed towards the receiver 18 indicated in the shipping address data associated with the package. In this situation, the computer system 22 can generate the appropriate transporting instruction 87 and transmit it to the hub control unit 44 via the network 32. In another embodiment, so long as it is determined by the computer system 22 that no limits or range was transcended, the computer system 22 will not interfere with the hub control unit 44 and allow it to generate the transporting instruction based on the shipping address data. However, if the computer system 22 determines that the environmental condition has transcended a minimum or maximum limit or range based on the product environment data, the computer system 22 can generate a transporting instruction 87 indicating that the transporting is to be performed differently as compared to normal processing by shipment to the receiver 18 indicated by the address data associated with the product 13 and/or container 14. The computer system 22 can then transmit the transporting instruction 87 via the network 32 to one or more points within the carrier's logistics network 20, including but not limited to, the hub 28 from which the product environment data 85 was received.

As described in the embodiments above, a transporting instruction assigned to a container 14 housing the product 13 can be generated at the delivery hub 28 by the hub control unit 44 or it can be generated by the computer system 22 and transmitted via a network 32 to the hub control unit. In either situation, the transporting instruction assigned to the product 13 and/or container 14 is sent from the hub control unit 44 to the machine controller 46. In one embodiment, the machine controller 46 implements the transporting instruction. Machine controllers such as unit 46 are known in the art. In general, the sortation system 36 uses conventional systems, including belt optical encoders, to track the position of containers 14 with their products 13 as they move through the hub 28. The sort machinery unit(s) 48 used to track and direct the movement of containers 14 and products 13 through a hub facility are known in the art. Information about the use of tilt trays in a sortation system is available in U.S. Pat. Nos. 5,433,311 and 5,489,017, both issued to Bonnet and both of which are herein incorporated by reference. U.S. Pat. No. 6,005,211 to Huang and U.S. Pat. No. 5,547,063 to Bonnet also discuss the use of the sorter in the hub, and these patents too are hereby incorporated by reference.

Figure 3:
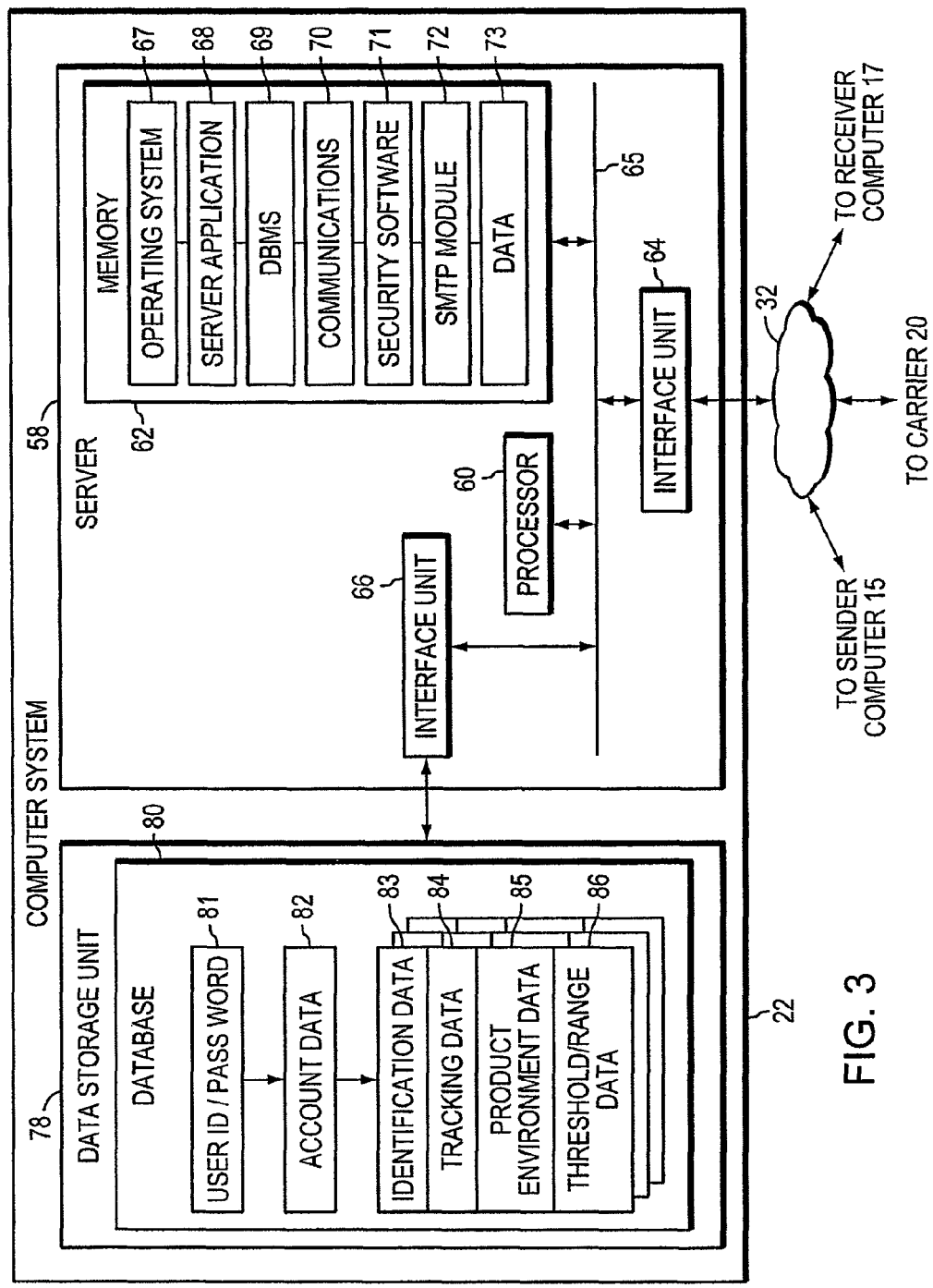
FIG. 3 is a block diagram of a computer system in accordance with the invention depicted in FIGS. 1-2.

FIG. 3 shows a block diagram of a computer system 22 in accordance with the invention depicted in FIGS. 1-2. The computer system 22 includes a server 58 and a data storage unit 78. The server 58 comprises a processor 60 and memory 62. The server 58 can also comprise interface units 64, 66, and bus 65. The processor 60 can be coupled via the bus 65 to receive and transfer signals and/or data to and from the memory 62 and interface units 64, 66 as it executes various software code stored in the memory 62. More specifically, the memory 62 stores various software executed by the processor 60, including an operating system 67 for controlling the allocation and usage of hardware resources; a server application 68 for processing identification data 83, tracking data 84, and product identification data 85 received from the carrier logistics network 20. The server application 68 can be executed by the server 58 to store the data 83, 84, 85 in the data storage unit 78. The server application 68 can be executed by the server 58 to generate a transporting instruction 87 for providing to machinery and/or worker(s) within the carrier logistics network 20.

The memory 62 can store a database management system (DBMS) 69 for generating commands to store, modify, delete, retrieve, join, divide, etc. data in the data storage unit 78. The memory 62 can store a communication module 70 for handling communications and data transmitted to and from, respectively, the server; security software 71 for performing user authentication and other security-related services such as encryption and decryption of data transmitted and received by the server; and a simple mail transfer protocol (SMTP) module 72 to be used in one embodiment of the invention when sending and/or receiving email notifications over a network 32. The memory 62 can include a data storage area or buffer 73 that can be used by any of the software modules listed above to store and retrieve data generated or required in the execution of such code. The first interface unit 64 is used by the processor 60 to send and receive data over a network 32, and the second interface unit 66 is used to transfer data between the server 58 and the data storage unit 78.

The data storage unit 78 stores a database 80. In one embodiment, the database 80 contains records of related data fields including a user ID and password 81, and account data 82 associated with the user ID and password. For each container 14 and its product 13 that are associated with a user account, the database 80 contains identification data 83 stored in association with tracking data 84 and product environment data 85. The identification data 83 can include a tracking identifier 23 such as a "1Z" alphanumeric character string for uniquely identifying the container 14 during the shipping process. The tracking data 84 can include data identifying the date, time, and/or place of particular events associated with the container 14 as it is transported from a sender 16 to a receiver 18 within a carrier's logistics network 20. Such events can include the arrival or departure of the container 14 at or from particular locations within the logistics network of the carrier 20 as the package is transported. The tracking data 84 can also include the identity of persons handling the package, such as the pickup or delivery driver, or a person acknowledging receipt of the package at a particular location by signing for the package.

In one embodiment, the product environment data 85 includes at least one measurement of temperature, pressure, vacuum, vibration, shock, humidity, moisture, light, air, and a chemical to which the product 13 within the container 14 has been exposed. Furthermore, the data storage unit 78 can store limit/range data 86, which defines the limit or range of measurements of an environmental condition prescribed to be acceptable to prevent spoilage of a product 13 under shipment. The limit/range data 86 can be used by the processor 60 to determine whether a product 13 has been subjected to an environmental condition adversely impacting the product by comparing the product environment data 85 with the limit/range data 86 to determine whether an acceptable limit has been transcended. The resulting determination can be used by the processor 60 to route the product 13 accordingly.

Figure 4:
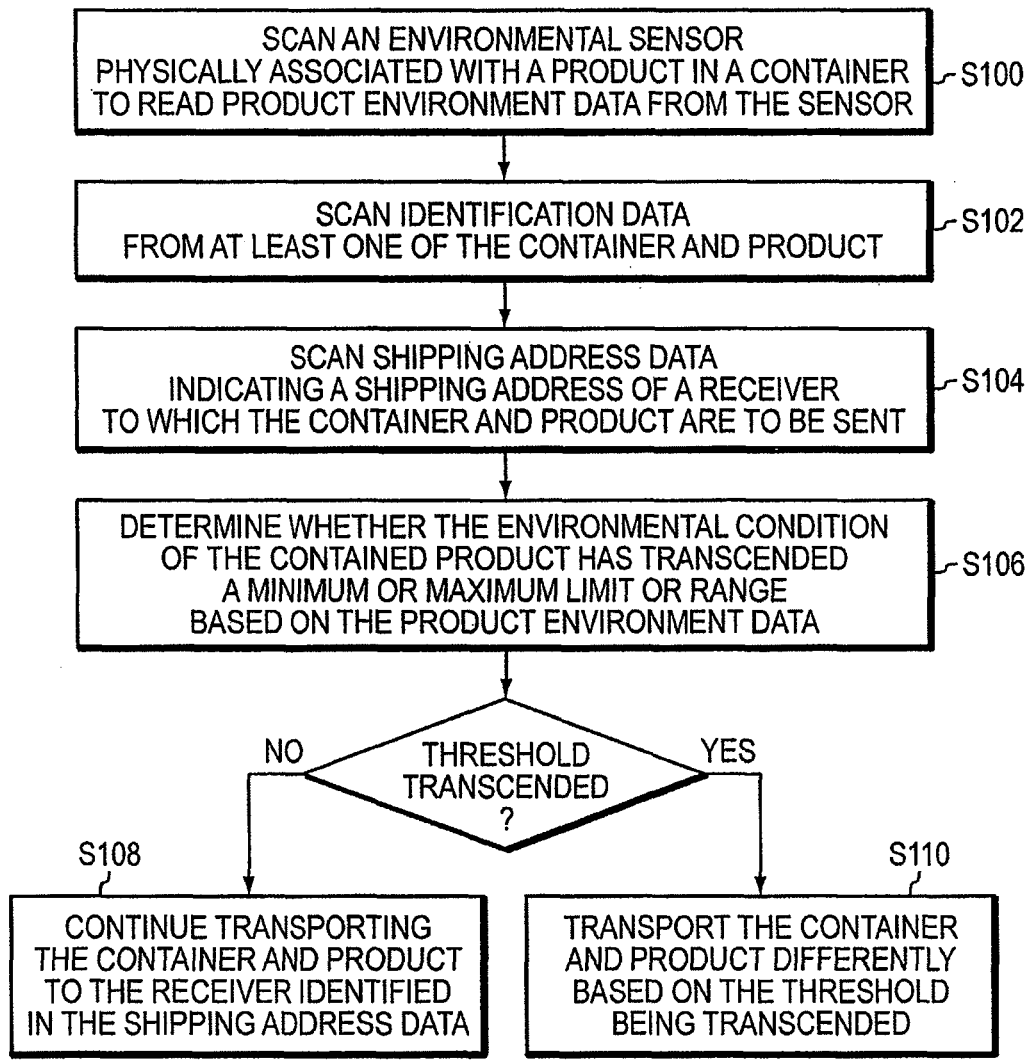
FIG. 4 is a process flow diagram of steps of a method for transporting a product based on product environment data in accordance with an embodiment of the present invention.

FIG. 4 is a process flow diagram that illustrates the steps for transporting a product 13 in a container 14 based on product environment data 85 in accordance with an embodiment of the present invention. At step S100, a scanning device scans an environmental sensor 12 physically associated with the product 13 in the container 14 at a location within the carrier's logistics network 20, to read product environment data 85 from the sensor. As previously mentioned, the container 14 can be an individual package, a shipping container, or any other type of container enclosing a product that is transported from a sender 16 to a receiver 18. In one embodiment, the environmental sensor 12 is a radio-frequency identification (RFID) sensor tag, and the scanner is an RFID interrogator that transmits and receives radio frequency signals from the tag in the performance of the scanning step.

The nature of the product environment data 85 obtained in the scanning step depends on the type of sensor 12 used. The environmental sensor 12 can be capable of sensing one or more environmental conditions to which the product 13 is subjected, such as temperature, pressure, the presence or absence of a vacuum, vibration, shock, humidity, moisture, light, air, and the presence or absence of a particular chemical. In one embodiment, the sensor 12 can be configured to generate product environment data 85 that comprises time data generated in association with corresponding product environment samples for indicating the time of sensing the environment condition associated with the container 14. In another embodiment, the environmental sensor 12 can be programmed to determine whether the environment condition of the container 14 has transcended a minimum and/or maximum limit, or a range of permissible values, based on the product environment data 85. In yet another embodiment, the sensor 12 can comprise a visual indicator operable to signify that the environment condition of the contained product 13 has transcended a minimum and/or maximum limit or range. For example, the visual indicator can include at least one light-emitting diode (LED) illuminated so as to change from a first color to a second color in response to the environment condition of the contained product transcending a minimum and/or maximum limit or range. Other types of sensors 12 previously mentioned can also be used effectively in the system 10.

At step S102 of FIG. 4, a scanning device is used to read identification data 83 from at least one of the product 13 and container 14. The identification data 83 can be stored on the environmental sensor 12, a shipping label 21 affixed to the container 14, or some other tag associated with at least one of the product and container. The identification data 83 preferably includes a tracking identifier 23 that uniquely identifies at least one of the product 13 and container 14. The tracking identifier 23 can be an identifier that is typically used by a carrier to track packages. Alternatively, the identification data 83 can be Electronic Product Code™ indicia embedded in memory contained within a smart tag or chip on a particular product. At step S104, the product 13 and/or container 14 is scanned to read shipping address data that indicates the shipping address of a receiver 18 to which the product and container 14 are to be sent. The shipping address data can be stored on the environmental sensor 12, a shipping label 21 affixed to the container 14, or some other tag physically associated with at least one of the product and container.

At step S106, a computer system connected to receive the scanned data from the one or more scanning devices used in the above-indicated steps determines whether the environmental condition of the contained product 13 has transcended a minimum or maximum limit or passed outside of a prescribed range based on the product environment data 85. In one embodiment, the computer system performing the determining step is the hub control unit 44 of the hub 28 of FIG. 2, which generates a transporting instruction based on the determining step. In another embodiment, the determining step can be performed by the computer system 22 of FIGS. 1-2. In this embodiment, the scanned data can be transmitted via a network 32 to the computer system 22, which then determines whether the environmental condition of the contained product has transcended a minimum or maximum limit or range based on the product environment data 85. The computer system 22 can generate a transporting instruction 87 based on the determining step, and then transmit the instruction via the network 32 to at least one point within the carrier's logistics network 20, such as a hub 28 or a delivery driver 30, for use in transporting the product and container 14.

The transporting of the container 14 depends on whether a minimum or maximum limit or range was transcended based on the product environment data 85. Minimum or maximum limits defining a limit or range of permissible values can be stored in the environmental sensor 12, or they can be stored in a database accessible by the carrier 20 using the identification data 83 associated with at least one of the product 13 and container 14. If the product environment data 85 indicates that no limit or range has been transcended, then at step S108 of FIG. 4, the carrier will continue transporting the product and container 14 to the receiver 18 identified in the shipping address data. However, if it is determined that a minimum or maximum limit has been transcended based on the product environment data 85, then at step S110 the transporting instruction 87 may direct a carrier facility to transport the product and container 14 differently than handling that would otherwise be used in the performance of step S108. For example, the result of transcending a particular limit or range can be such as to require that the product 13 and container 14 be rerouted to an alternate destination. The alternate destination may be a disposal site, or a different receiver than the receiver 18 to whom the product and container 14 were originally to be sent. The alternate destination can be identified by data stored on the environmental sensor 12, or it can be stored in a database accessible by the computer system 22 using the identification data 83.

Figure 5:
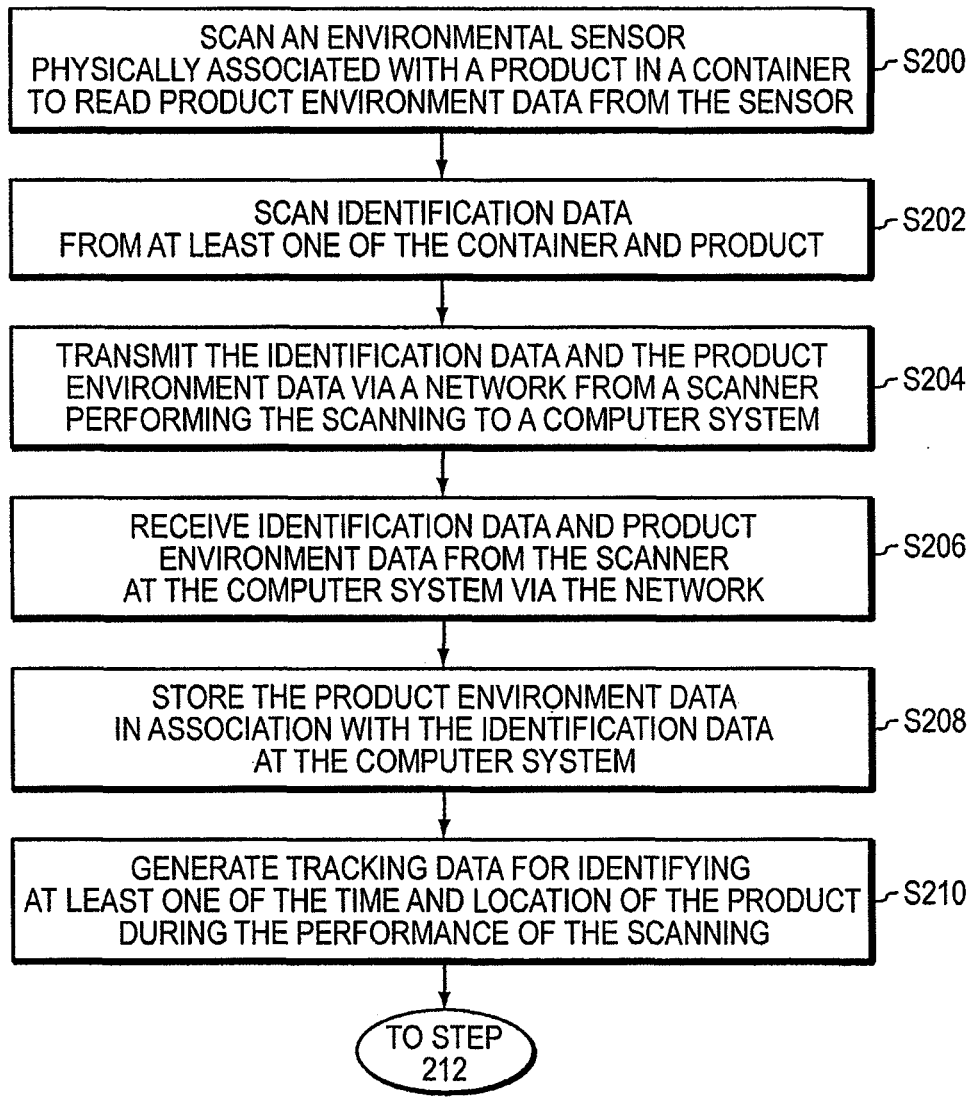
FIGS. 5-6 are process flow diagrams of steps of a method for providing history data of the environmental conditions to which a product has been subjected during shipment in accordance with an embodiment of the present invention.

FIG. 5 is a process flow diagram that illustrates the steps for generating history data indicating the conditions to which a product 13 in a container 14 is subjected during shipping in accordance with an embodiment of the present invention. One advantage to generating such history data is that it allows the carrier, customers and other authorized personnel to analyze the data so as to look for possible patterns of environmental conditions that may be occurring during certain times and/or at certain places within a carrier's logistics network 20. For one thing, this can be very beneficial for testing the durability and effectiveness of different types of packaging under a variety of environmental conditions. Additionally, the environmental history data provides both carrier and customers with the ability to look for adverse conditions that may be recurring at various points along particular shipping routes. In some cases, upon detecting such a problem, a customer may be able to request that shipments of a particular type of product 13 be shipped via an alternate route so as to avoid the adverse condition(s) associated with a particular shipping lane within the carrier's logistics network 20. Similarly, the carrier can use the data as a diagnostic tool to help identify and correct recurring problems within its logistics network 20.

At step S200, a scanning device scans an environmental sensor 12 physically associated with a product 13 in a container 14 at one or more locations to read product environment data 85 from the sensor. The container 14 may be an individual package, a shipping container, or any other type of container enclosing a product 13 that is transported from a sender 16 to a receiver 18. In one embodiment, the sensor 12 is a radio-frequency identification (RFID) sensor tag, and the scanner is an RFID interrogator 40 that transmits and receives radio frequency signals from the tag in the performance of the scanning step.

At step S202, a scanning device is used to read identification data 83 from the product 13 and/or the container 14. The identification data 83 can be stored on the environmental sensor 12, a shipping label 21 affixed to the container 14, or some other tag physically associated with the product and/or container. The identification data 83 preferably includes a tracking identifier 23 that uniquely identifies at least one of the product 13 and container 14. The tracking identifier 23 can be an identifier that is typically used by a carrier to track packages, or it may comprise Electronic Product Code™ indicia or data embedded in a memory chip contained within a smart tag on a particular product. At step S204, the identification data 83 and the product environment data 85 are transmitted via a network 32 from the one or more scanners 41 performing the scanning to a computer system 22.

At step S206 of FIG. 5, the identification data 83 and product environment data 85 is received at the computer system 22 via the network 32 from the one or more scanners 41 performing the scanning. The computer system 22, in step S208, stores the product environment data 85 in association with the identification data 83 in the computer system. At step S210, tracking data 84 is generated. This can be done, for example, by configuring the scanner 41 to "timestamp" the scanned data in a manner known in the art. In another embodiment, the computer system 22 can be programmed to identify the particular location of a scanner 41 based on a received scanner ID number, so that when the computer system 22 receives tracking data in association with a particular scanner ID number, the computer system can refer to a database to retrieve this data. The tracking data 84 can comprise time, date and/or location of the product 13 and container 14 during the performance of the scanning. The tracking data 84 can further comprise data indicating such things as the identity of persons handling a container 14, such as a pickup or delivery driver, or a person acknowledging receipt of the package at a particular location by signing for the package.

Figure 6:
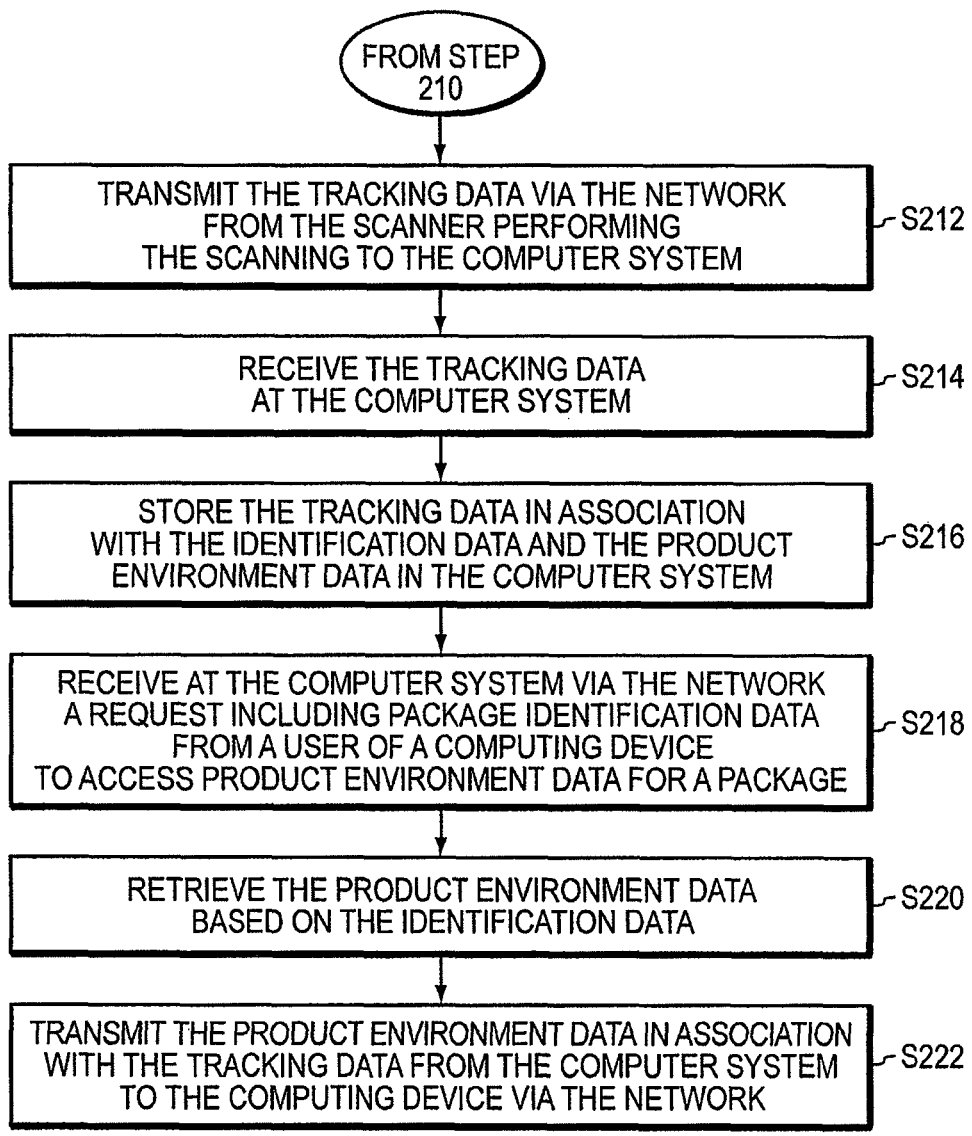

Turning now to FIG. 6, the process continues at step S212, wherein the tracking data 84 is transmitted via the network 32 to the computer system 22 from a scanner 41 performing the scanning. The tracking data 84 is received at the computer system 22 at step S214, and in step S216 the tracking data 84 is stored in association with the identification data 83 and the product environment data 85 in the computer system. The data stored in the computer system 22 provides history data indicating the environmental conditions to which the product 13 in the container 14 has been subjected to at a plurality of locations and times in the transporting of the product.

At step S218, the computer system 22 receives via the network 32 a request from a user of a computing device to access product environment data 85 associated with a container 14. In one embodiment, the request includes identification data 83 for identifying the container 14. The request can also include user identification data, such as a username and password 81, to be used by the computer system 22 in determining whether a particular user is authorized to access the product environment data 85. Based on the data in the request, at step S220 the computer system 22 retrieves the product environment data 85 that the user is authorized to access, and in step S222 the computer system transmits the product environment data 85 in association with the tracking data 84 from the computer system to the computing device via the network 32.

Many modifications and other embodiments of the invention set forth herein will come to mind to one skilled in the art to which this invention pertains having the benefit of the teachings presented in the foregoing descriptions and the associated drawings. For example, those skilled in the art will recognize that the functionality of the computer system 22 as described in FIG. 3 can be carried out on a plurality of computers capable of communicating via a network 32 such as the Internet or other communication network, and, accordingly, need not be discussed here for an understanding of the subject invention. In other words, rather than have a single server 18 to perform the described functions, these functions can be executed by two or more distributed computers, and such modification is expressly contemplated to be within the scope of this invention. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising the steps of:
   collecting environmental data using an environmental sensor associated with a container such that the sensor travels with the container within a carrier's logistics network;
   receiving the environmental data collected by the environmental sensor at a computer system;
   determining with the computer system whether an environmental condition of the container has transcended a limit based on the collected environment data; and
   in response to the computer system determining the environmental condition has transcended the limit, generating a transporting instruction with the computer system to alter the delivery of the container.

2. The method of claim 1, wherein the transporting instruction redirects the container to an alternate destination different from its original destination.

3. The method of claim 1, wherein the transporting instruction upgrades the service level of the container.

4. The method of claim 1 further comprising the steps of:
   collecting tracking data including identification data identifying the container and location data identifying the location of the container;
   receiving the tracking data at the computer system; and
   linking the tracking data with the environmental data based at least in part on time or location.

5. The method of claim 1, wherein the environment data relates to at least one of temperature, pressure, vacuum, vibration, shock, humidity, moisture, light, air and a chemical to which the container has been subjected.

6. The method of claim 1, wherein the transporting instruction comprises the identification of an alternate tip position corresponding to the alternate destination.

7. The method of claim 1 wherein the environmental sensor is a radio frequency identification tag (RFID).

8. The method of claim 7, wherein the RFID tag is a passive radio frequency identification tag.

9. The method of claim 7, wherein the RFID tag is an active radio frequency identification tag.

10. The method of claim 1, wherein the environmental sensor associated with said product further comprises a visual indicator activated automatically by the environmental sensor if the environmental sensor determines the environmental condition has transcended the first limit, wherein the visual indicator changes its visual appearance when the environmental condition has transcended the first limit.

11. A system comprising:
    an environmental sensor associated with a container and travels with the container as it moves within a carrier's logistics network;
    a computer system configured to:
       determine whether an environmental condition of the container has transcended a limit based on the collected environment data; and
       generate a transporting instruction to alter the delivery of the container in response to determining the environmental condition has transcended the limit.

12. The system of claim 11, wherein the environmental sensor senses at least one of temperature, pressure, vacuum, vibration, shock, humidity, moisture, light, air and a chemical to which the container has been subjected.

13. The system of claim 11, wherein the transporting instruction comprises the identification of an alternate tip position corresponding to the alternate destination.

14. The system of claim 11, wherein the environmental sensor is a radio frequency identification tag (RFID).

15. The system of claim 11, wherein the environmental sensor comprises a visual indicator activated automatically by the environmental sensor if the environmental sensor determines the environmental condition has transcended the first limit.

16. The method of claim 11, wherein the transporting instruction redirects the container to an alternate destination different from its original destination.

17. The method of claim 11, wherein the transporting instruction upgrades the service level of the container.

18. A non-transitory computer program product comprising at least one computer-readable storage medium having computer-readable program code portions embodied therein, the computer-readable program code portions comprising:

(A) a first executable portion configured for receiving environmental data collected by an environmental sensor associated with a container such that the sensor travels with the container within a carrier's logistics network;
(B) a second executable portion configured for determining whether an environmental condition of the container has transcended a limit based on the collected environment data; and
(C) a third executable portion configured for, in response to determining the environmental condition has transcended the limit, generating a transporting instruction to alter the delivery of the container.

* * * * *